United States Patent
Scheffer

4,019,808
Apr. 26, 1977

[54] ARRANGEMENT FOR A POLYCHROME DISPLAY

[75] Inventor: Terry James Scheffer, Wettingen, Switzerland

[73] Assignee: Fraunhofer-Gesellschaft zur Förderung der Angewandten Forschung e.V., Munich, Germany

[22] Filed: May 5, 1976

[21] Appl. No.: 683,342

Related U.S. Application Data

[63] Continuation of Ser. No. 477,541, June 7, 1974.

[30] Foreign Application Priority Data

June 9, 1973 Germany .......................... 2329618

[52] U.S. Cl. ...................... 350/160 LC; 350/148; 350/150
[51] Int. Cl.² ........................................... G02F 1/13

[58] Field of Search ............ 350/148, 150, 160 LC

[56] References Cited
UNITED STATES PATENTS

| 3,731,986 | 5/1973 | Fergason .......................... 350/150 |
| 3,806,227 | 4/1974 | Greubel et al. .................... 350/150 |

*Primary Examiner*—Edward S. Bauer
*Attorney, Agent, or Firm*—John C. Smith, Jr.

[57] ABSTRACT

An arrangement for a polychrome display comprises in serial association a light source, a linear polarizing filter, at least one nematic liquid crystal rotating element, and either a passive birefringent retardation plate followed by a further neutral linear polarizing filter or a selective polarizer.

11 Claims, 8 Drawing Figures

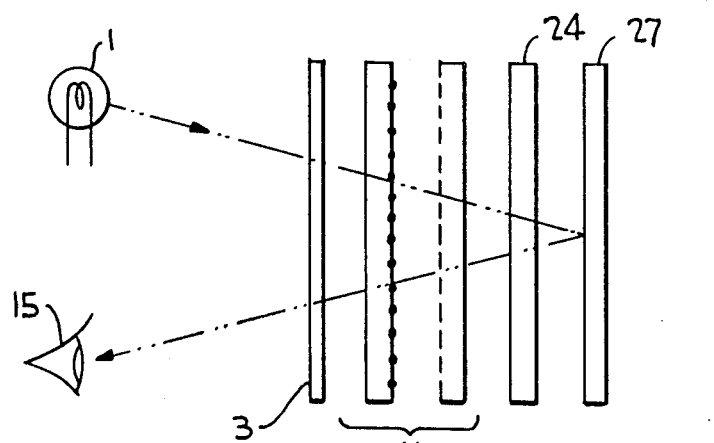
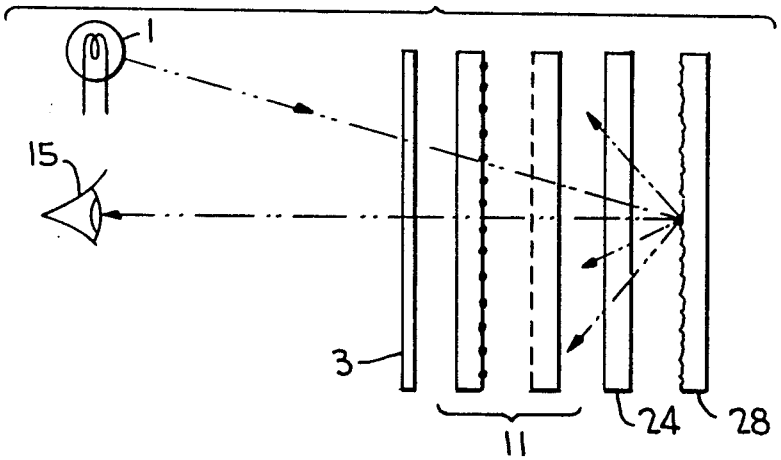
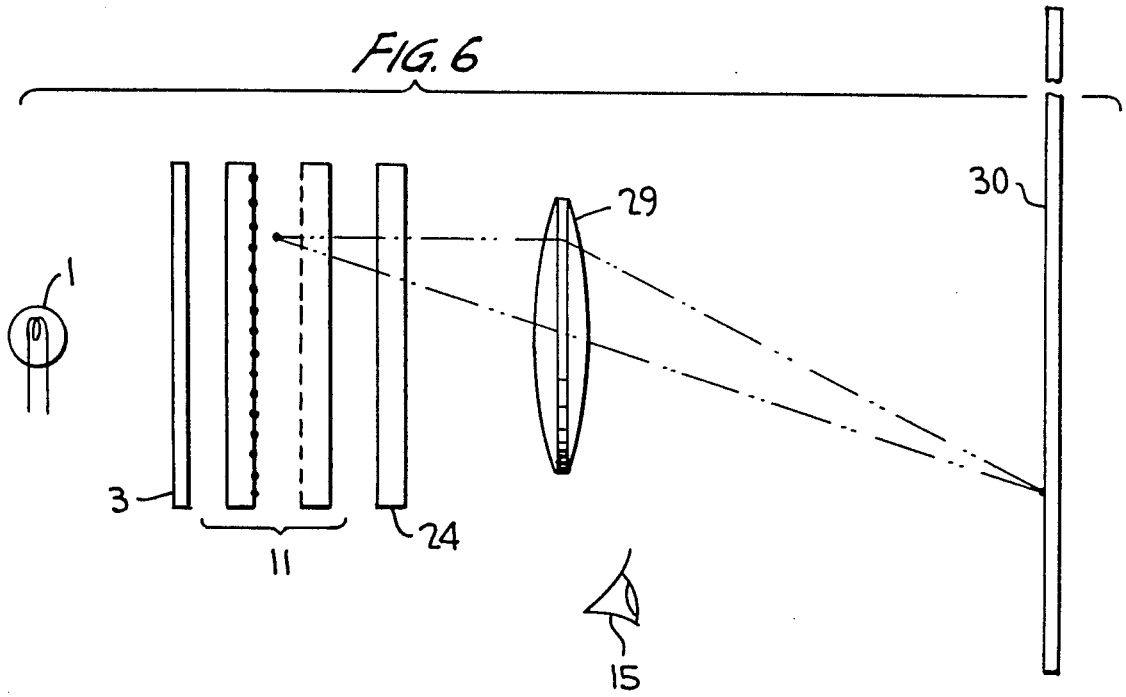

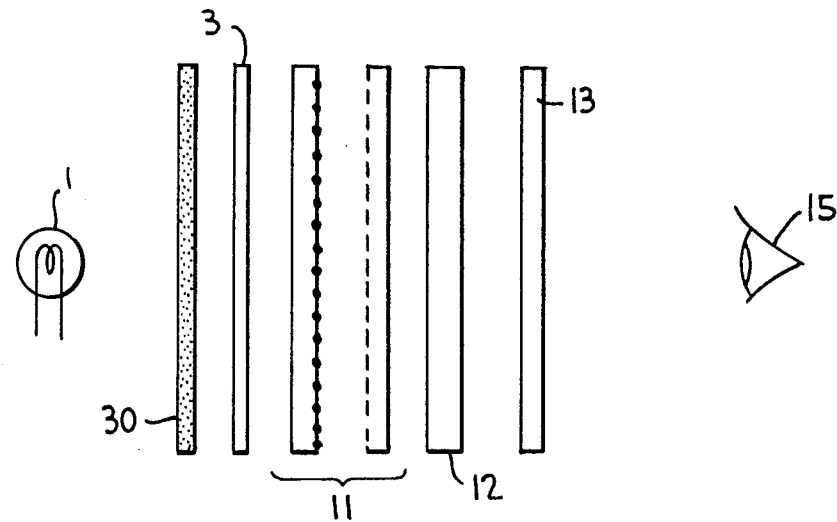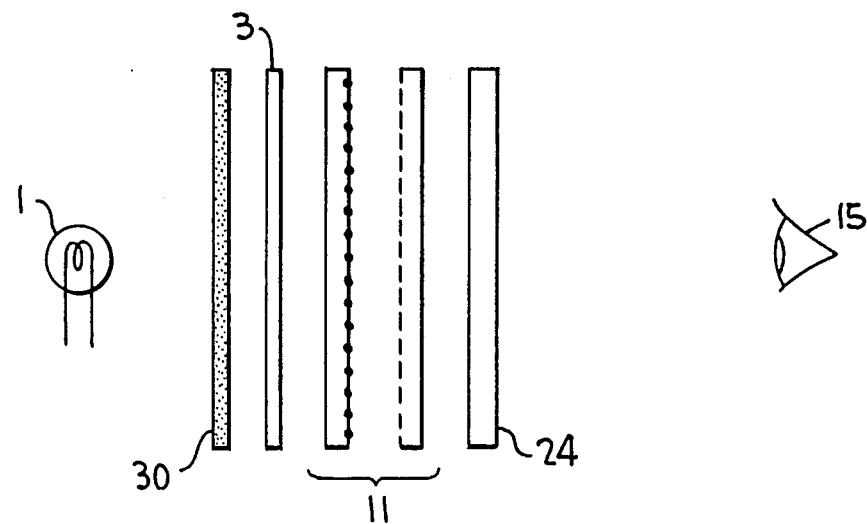

ARRANGEMENT FOR A POLYCHROME DISPLAY

This is a division of application Ser. No. 477,541, filed June 7, 1974.

BACKGROUND OF THE INVENTION

The present invention relates to an arrangement for a polychrome display, comprising a light source and linear polarisation filters.

It has already been proposed in German Patent Application No. OS 2,148,378 (published Apr. 5, 1973) to provide a nematic liquid crystal cell between crossed polarising films of which one is a selective polariser. Only a specified band of wave lengths in the visible spectrum of unpolarised light passing through the selective polariser is linearly polarised. In the "field-off" state of the nematic liquid crystal cell the optic axis of the cell is uniformly normal to the incident light and the state of polarisation of the light is not therefore changed. The light passing through the analyser will therefore have the color of the transmitted band which traversed the first polariser without having been selectively polarised. In the "field-on" state the optical axis of the nematic layer ceases to be parallel to the direction of the incident light and the nematic layer therefore considerably affects the original state of polarisation of the incident light. Consequently about half the light that had originally been polarised at 90° in relation to the analyser will now pass and complement the unpolarised portion of the spectrum to form a nearly white light.

In a second arrangement likewise described in the above-mentioned German Patent Application use is made of the depolarisation of light induced by an electric field in a nematic liquid crystal film. In this arrangement a nematic layer is interposed between two crossed linear polarising filters and a passive birefringent optical wave plate or retardation plate is placed between the liquid crystal film and the analyser. In the field-on state the optical axis of the liquid crystal layer is uniformly parallel to the incident light so that white light passing through the layer remains linearly polarised until it falls on the retardation plate. The light transmitted by the analyser is colored because of the selective interference between components of the ordinary and the extraordinary ray separated by the birefringence of the plate. The color which actually appears is determined by the thickness and the birefringence of the plate. In the field-on state the nematic layer depolarises the light and the light traversing the retardation plate will also be depolarised. In the field-on state the analyser will therefore transmit white light.

It is a shortcoming of both these arrangements that substantially they control only one color. Two colors can be controlled by the addition of a conventional color filter of the absorption type for coloring the white light traversing the arrangement when the field is on, but this color must also contain the color which is transmitted by the arrangement when the field is off. It would therefore be impossible to control two pure primary colors by this method. In the first of the two Siemens arrangements the color contrast between the field-on and the field-off states is limited by the working principle of the described method and not by the selective polariser itself. In the field-on state the transmitted intensity of the selectively unpolarised spectral band is still greater than that of the remainder of the visible spectrum. The generation of several colors by a serial combination of two or more such assemblies comprising polarisers which absorb selectively in different spectral wave bands would not therefore be very effective. In the second above-described arrangement three primary colors could be controlled by serially associating three assemblies, each containing a retardation plate suitable for one primary color. This technique would, however, also be rather inefficient because in the field-on state each assembly would transmit less than half the incident light.

SUMMARY OF THE INVENTION

It is the object of the invention to avoid these shortcomings.

The present invention avoids these shortcomings by providing, in serial association, a light source, a liner polarising filter, a nematic liquid crystal rotating element, and either a passive birefringent retardation plate followed by a further neutral linear polarising filter or a selective polariser.

The substance of this idea consists in taking advantage of the unique properties of the electro-optical element of the nematic rotating cell for the purpose of changing the plane of polarisation of the light instead of depolarising the same, as is done in the methods accordng to German Patent Application No. OS 2,148,378. Colors can be produced by the selective interference of two light rays which have been separated by a passive optical retardation plate. Different colors can be transmitted when the plane of polarisation of the incident light is rotated. Since the light is not anywhere depolarised it is possible to associate several assemblies in series in order to produce more colors without a significant efficiency loss.

BRIEF DESCRIPTION OF THE DRAWING

Embodiments of the invention will be more particularly and purely illustratively described with reference to the accompanying drawing, in which:

FIG. 4 is an arrangement employing a polished reflecting mirror;

FIG. 5 is an arrangement employing a diffusing reflector;

FIG. 6 is an arrangement employing an optical imaging system to project the transmitted colors on a screen;

FIG. 7 is an arrangement employing a passive optical color filter between the light source and the first polarizing filter; and FIG. 8 is another arrangement employing a passive optical color filter between the light source and the first polarizing filter.

DESCRIPTION OF THE PREFERRED EMBODIMENTS

Figure 1:
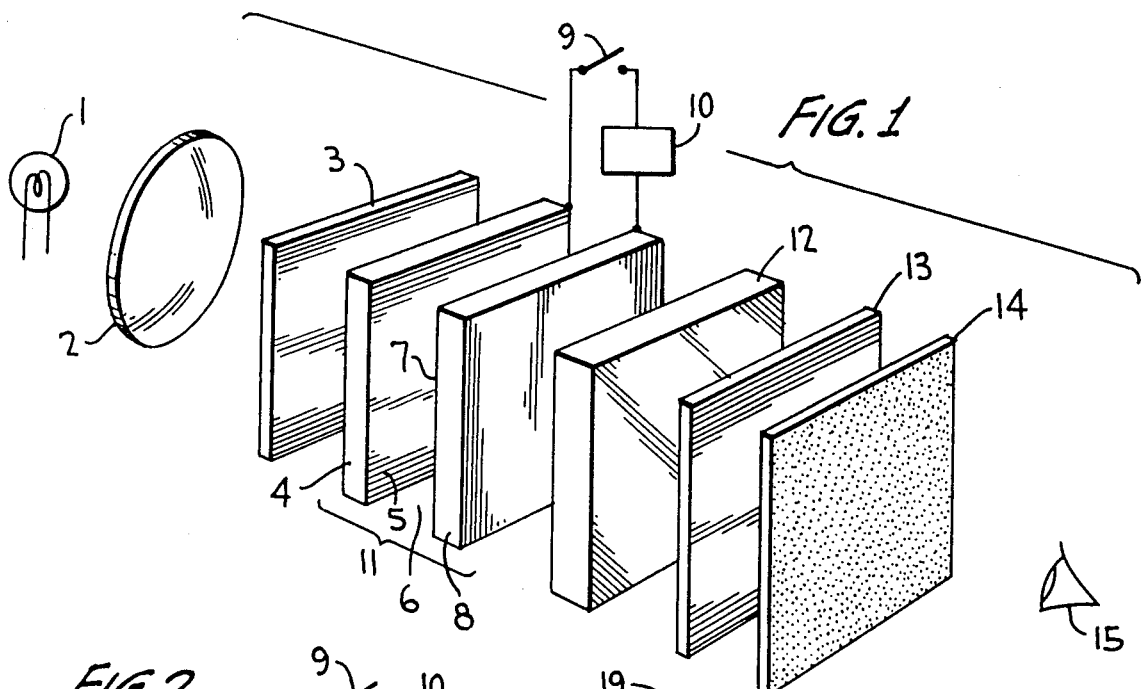
FIG. 1 is a perspective exploded schematic representation of an electro-optical two-color display system according to the invention, comprising a passive optical retardation plate.

The method of color display illustrated in FIG. 1 makes use of a nematic liquid crystal rotating cell 11 as the electro-optical element. Such an electro-optical element has already been described in the published specifications of German Patent Applications Nos. OS 2,158,563 (published June 29, 1972) and OS 2,202,555 (published Aug. 31, 1972) and only a brief description will here be given. The purpose of this element is to impart a 90° rotation to the plane of polarisation of a light ray passing through such a cell when no potential is applied to the same (field-off state) and to leave the plane of polarisation unchanged when potential is applied (field-on state). FIG. 1 shows the components constituting a nematic rotating element. The element consists of a layer of nematic liquid crystals exhibiting positive dielectric anisotropy 6 between two parallel glass plates 4 and 6 whose facing sides 5 and 7 are coated with an electrically conducting but optically transparent material, such as $SnO_2$. These facing surfaces 5 and 7 which are typically spaced between 6 $\mu$ and 100 $\mu$ apart serve as electrodes and they are connected by a switch 9 to a voltage source 10. For particular applications the electrodes may be divided into segments in different ways and means provided for selectively applying potential to different segment combinations. In such a case the optical cell which is shown in FIG. 1 would constitute only part of the overall color display system, namely a particular pair of electrode segments. The surface of the transparent electrode 5 is specially treated. It has been rubbed with a fine polishing agent only in the horizontal direction in order preferentially to align the nematic liquid crystals which directly contact the electrode uniformly in this particular direction. The surface of the other transparent electrode 7 has been similarly treated, but the electrode is turned 90° so that the preferential direction of the directly contacting layer of liquid crystals on this side is in the vertical. If no potential is applied to the electrodes the preferential local direction of orientation of the nematic liquid crystals exhibits a uniform 90° helical twist from one electrode to the other. Hence, if the plane of polarisation of the incident light is parallel (as in FIG. 1) or normal to the preferential orientation of the layer of liquid crystals adjacent the electrode 5, then the plane of polarisation of the light passing through the layer will be rotated coincidently with the twist of the nematic crystal structure, leaving the other side of the element with a 90° turn of its plane of polarisation. If now a suitable voltage 10 is applied to the electrodes, then the preferential orientation of the nematic liquid crystals will change and substantially they will realign with the direction of the applied electrical field. under these conditions the light beam will travel through the element 11 without its state of polarisation being changed.

The nematic electro-optical rotating cell will be fully functional if the voltages applied are about twice the minimum level of voltage response characteristic of the particular nematic liquid crystal mixture employed. At these voltages the unit will operate in a state of saturation and no further improvement in the performance of the element can be achieved by raising the voltage still further, Nematic rotating elements which operate at 1.3 volts have already been described in the literature. In the saturated state the performance of the element is not affected by temperature changes (provided the temperature remains within the nematic range) or by unavoidable minor fluctuations in the thickness of the nematic layer. The nematic rotating element is based on the principle of purely dielectric orientation. This means that no electric power is needed to maintain the field-on state of the cell. Since mechanisms related to space charges play no part, the possibility of electrochemical reactions which might impair the life of the unit is also avoided.

An arrangement according to the invention is shown in FIG. 1. A parallel beam of white light of intensity $I_o$, produced for instance by a light source 1 and a suitable lens system 2, falls on a polarising filter 3 which is so orientated that is transmits only linearly polarised light of which the electrical field vector is in the horizontal. This light beam then enters a nematic electro-optical rotating element 11 of the above-described type. This is so orientated that the preferential orientation of the nematic layer adjacent the first electrode 5 is parallel to the plane of polarisation of the incident light. In the field-off state the plane of polarisation of the incident light will therefore be rotated through 90°. The light leaving the element will be polarised in the vertical. The beam then passes through a birefringent retardation plate or sheet 12 which is so orientated that its optical axis is at an angle of 45° to the vertical. In this retardation plate the beam is split into two independent light rays, for each of which the refractive index is different. The wave fronts of the two beams leave the retardation plate with an optical shift in phase. These two beams are then recombined in a further polarising filter 13 which is orientated in the same direction as 3. There will then be selective interference between components of the two beams which are horizontally polarised. The intensity of the transmitted light will depend upon its wave length $\lambda$. The intensity of specific transmitted colors will therefore be greater than that of light of other colors. This means that the white light entering the polarising filter 3 leaves the polarising filter 13 as colored light. When the nematic rotating element 11 is in the field-on state the light leaving the element will be horizontally polarised. The transmitted color when the element is in the field-on state will be complementary to the transmitted color in the field-off state. The two colors which can be generated by the described arrangement can be seen by an observer 15 whose eye is in the path of the light. It would be possible to interpose a diffusion filter 14 in the path of the light to scatter it and thus to make it visible to an observer positioned at an angle. Alternatively a lens could be provided to project an image of the nematic rotating element on a screen.

When this two-color display system is tested it provides to work just as effectively when the sheet polarisers 3 and 13, the nematic rotating element 11 and the retardation plate or sheet 12 are turned through an angle of 90° either severally or in any combination. This two-color display is not subject to the defects of the above-described earlier systems.

Figure 2:
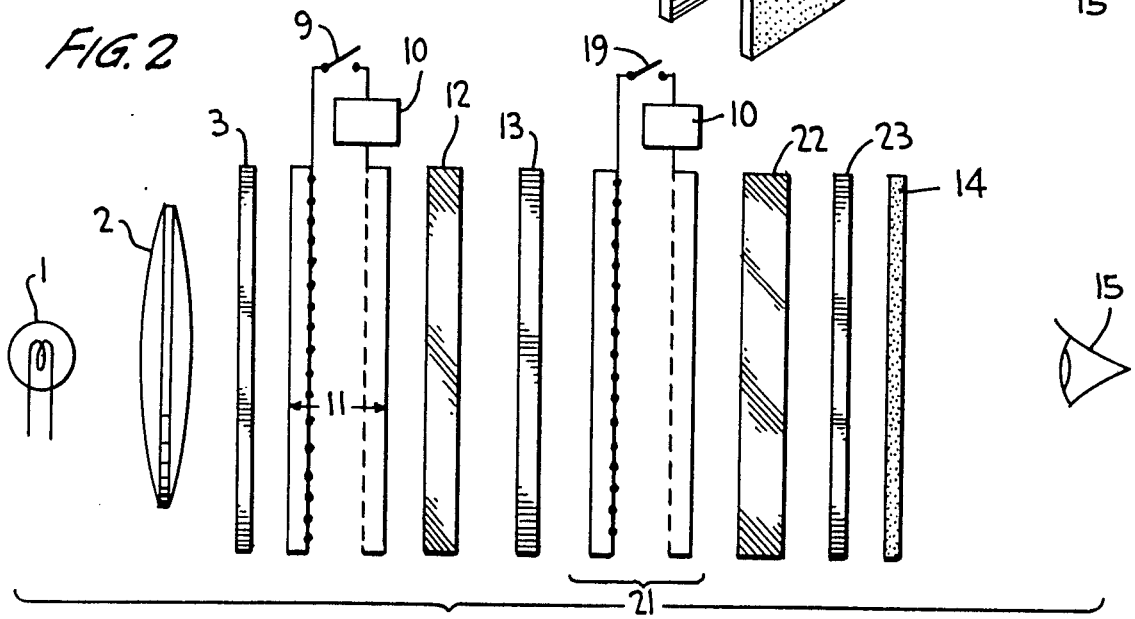
FIG. 2 is a cross section of an electro-optical four-color display system according to the invention, comprising two passive optical retardation plates.

More particularly it readily permits more than two colors to be produced by serially associating two or more high efficiency units. This will be described by reference to FIG. 2.

The first part of the optical system is the same as that shown in FIG. 1, the components being a polarising filter 3, a nematic liquid crystal rotating element 11 controlled by a switch 9, an optical retardation plate or wave plate 12 and another sheet polariser 13 which is orientated in the same direction. This is now followed by another nematic element 21 controlled by a switch 19, another retardation plate 22 and a polarising filter 23. In order to avoid complicating the description the elements comprised in this serial set are orientated in the same direction although any combination thereof could be turned through an angle of 90° without affecting the principle of operation of the system. As previously described an observer will see the light scattered by a diffusion filter 14 or he may see it projected on a screen.

The first part of the system can transmit either of two color to the second part of the system, depending upon whether the element 11 is in a field-on or a field-off state. The second part of the system comprising elements 21, 22 and 23 can transmit two fresh colors for each color received from the preceding part, now depending upon the position of switch 19. Consequently this system permits four different colors to be produced according to the four positional combinations of the two on-off switches 9 and 19.

It is a particular feature of this arrangement that the sum of the four possible colors would together recombine to white light.

The three primary colors can be obtained by this system if the two electro-optical nematic elements 11 and 21 are controlled in suitable combinations by the switches.

Figure 3:
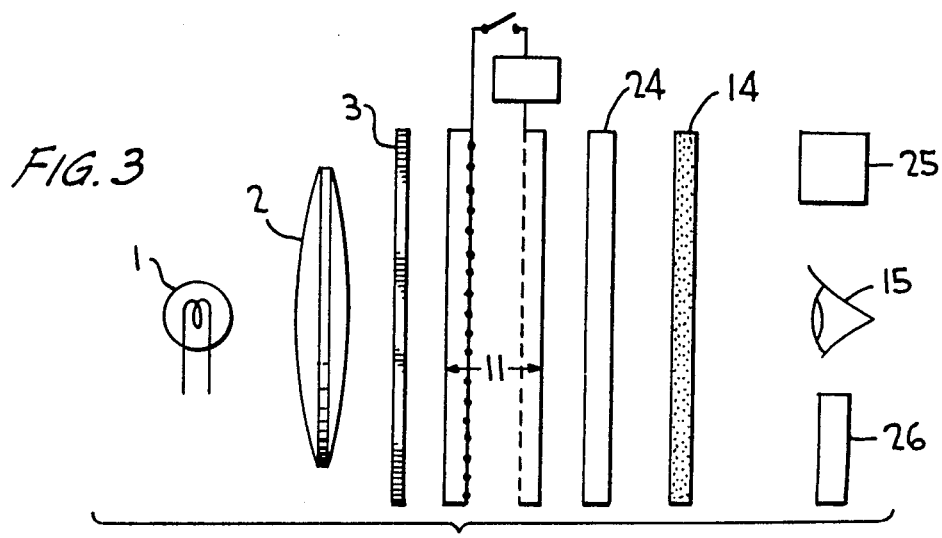
FIG. 3 is an arrangement employing a selective polariser.

FIG. 3 is a combination of a rotating element 11 and a selectively absorbing pleochroic element 24. The parallel beam from a light source 1 is first linearly polarised by a polariser 3. On traversing the rotating element 11 the plane of polarisation of the light will either remain unchanged or it will be rotated through an angle of 90°, according to the position of the switch. If the direction of polarisation of the light and the direction of the transition moments in the selectively absorbing element 5 coincide, the wave length corresponding to the transition will be absorbed. If the plane of polarisation of the light and the transition moment are relatively normal, the probability of absorption for this transition will be zero, and no absorption will therefore take place. For instance, if the light source 1 used were for instance a thermal radiator, then either the entire spectrum would be transmitted or a range of wave lengths would be absorbed from the spectrum according to the position of the rotating element. The change in spectral composition of the transmitted light thus achieved is also a change in color.

The selective polarising filter 24 may consist of a film containing orientated pleochroic pigment molecules or it may be composed of two foils in which different pleochroic pigments have been incorporated and which can be relatively turned. In the system illustrated in FIG. 3 the moments of absorption are so chosen that the incident light in the field-off state is not spectrally changed during its passage through the polariser. In the field-on state the light in a specific spectral range will be absorbed. An observer 15 in the path of the light will then see the color which is characteristic of the filter. Observers standing at an angle to the system will see this color if a diffusion filter 14 is interposed. Naturally the observer 15 may be replaced by a detector 25 or by a photo-sensitive layer 26.

The liquid crystals rotating element 11 may also be replaced by rotating devices based on the Faraday, Kerr or Pockels principles of operation.

FIGS. 4 and 5 illustrate reflection display systems wherein a mirror is placed on the exit side of the selective polarizer 24. in FIG. 4 the mirror is a polished reflecting mirror 27 and is FIG. 5 the mirror is a diffusing reflector 28. The mirrors 27 and 28 are arranged to reflect the light back through the selective polarizer 24, a nematic liquid crystal rotating cell 11 and polarizer 3 to the observer 15. In FIG. 5 the diffusing reflector 28 both reflects and scatters the light such that the observer will see the reflected colors when he is outside the direct path of the light.

In FIG. 6 a projection screen 30 is spaced from the selective polarizer 24 and a lens 29 is interposed between the screen and the selective polarizer to provide an optical imaging system to project the transmitted colors on a screen.

FIGS. 7 and 8 illustrate two further embodiments wherein a passive optical color filter 30 precedes the first polarizing filter 3. In FIG. 7 the positive optical color filter 30 is followed by the first polarizing filter 3, a nematic liquid crystal rotating cell 11, a birefringent plate 12 and a second polarizing filter 13, while in FIG. 8 the second polarizing filter is replaced by a selective polarizer 24.

The present invention offers several advantages over the previously developed display system using nematic liquid crystals and thus opens up new fields of application. The features which characterise the invention are the following:

1. It is capable of providing bright colors and wide contrasts.
2. The colors are fairly independent of temperature, so that temperature differences in large systems would not create problems.
3. The colors are independent of the layer thickness of the liquid crystal layer in the nematic rotating cell. Large surface displays are therefore possible because the unavoidable non-uniformities in layer thickness do not affect the colors.
4. Only a few volts are needed for controlling the colors and no electrical power is consumed for maintaining the field-on state.
5. The characteristic curve of the nematic rotating cell is such that it would be suitable for digital control. In the field-on state the voltage may fluctuate without affecting the functioning of the element because it is operated in the saturation range. Nematic rotating elements associated in series are ideally suitable for control by digital logic circuitry. An obvious field of application of the present invention would be the development of flat large surface color television screens.

The present invention is also suitable for any application in which a voltage-controlled optical filter is used.

The invention may be embodied in other specific forms without departing from the spirit or essential characteristics thereof. The embodiments are therefore to be considered in all respects as illustrative and not restrictive.

What is claimed is:

1. An arrangement for a polychrome display, comprising in serial association a light source, a linear polarizing filter, at least one electro-optical nematic liquid crystal rotating element adapted to rotate the plane of polarization of a light ray when no electrical potential is applied and to leave the plane of polarization unchanged when potential is applied, and a pleochroic color selective linear polarizer forming an assembly.

2. An arrangement set forth in claim 1, wherein said pleochroic color selective linear polarizer is in the form of a foil embedding pleochroic dye particles.

3. An arrangement as set forth in claim 1, wherein said pleochroic color selective polarizer consists of two foils incorporating different pleochroic dyes.

4. An arrangement as set forth in claim 1, comprising at least two of said electro-optical rotating elements and pleochroic color selective linear polarizers in series for the purpose of increasing the possible number of colors.

5. An arrangement as set forth in claim 4, wherein a polished reflecting mirror is provided on the exit side of the final pleochroic color selective linear polarizer to permit the arrangement to be operated by reflected ambient light.

6. An arrangement as set forth in claim 5, wherein the mirror also diffuses the light for the purpose of widening the angle of observation.

7. An arrangement set forth in claim 1, further comprising a light diffusing element adjacent the side of said pleochroic color selective linear polarizer opposite said electro-optical nematic liquid crystal rotating element for the purpose of widening the angle of observation.

8. An arrangement as set forth in claim 1, further comprising optical imaging means adjacent the side of said pleochroic color selective linear polarizer opposite said electro-optical nematic liquid crystal rotating element for the purpose of projecting the transmitted colors on a screen.

9. An arrangement as set forth in claim 1, wherein the electro-optical nematic liquid crystal rotating element comprises a pair of electrodes divided into segments to permit selected segments to be activated by the application thereto of potential.

10. An arrangement as set forth in claim 1, wherein the light source is arranged to emit colored light.

11. An arrangement as set forth in claim 1, wherein a passive optical color filter precedes the first polarizing filter.

* * * * *